United States Patent
Chu et al.

(10) Patent No.: US 9,575,231 B2
(45) Date of Patent: Feb. 21, 2017

(54) INFRARED FILTER

(71) Applicant: LARGAN PRECISION CO., LTD., Taichung (TW)

(72) Inventors: Kuo-Chiang Chu, Taichung (TW); Chien-Pang Chang, Taichung (JP)

(73) Assignee: LARGAN PRECISION CO., LTD., Taichung (TW)

( * ) Notice: Subject to any disclaimer, the term of this patent is extended or adjusted under 35 U.S.C. 154(b) by 46 days.

(21) Appl. No.: 14/027,155

(22) Filed: Sep. 13, 2013

(65) Prior Publication Data
US 2015/0062695 A1 Mar. 5, 2015

(30) Foreign Application Priority Data
Sep. 2, 2013 (TW) .............................. 102131588 A

(51) Int. Cl.
  *G02B 5/20* (2006.01)
  *G02B 5/28* (2006.01)

(52) U.S. Cl.
  CPC ............... *G02B 5/281* (2013.01); *G02B 5/285* (2013.01)

(58) Field of Classification Search
  CPC ............ G02B 5/281; G02B 5/285; G02B 5/20
  See application file for complete search history.

(56) References Cited

U.S. PATENT DOCUMENTS

| 3,914,023 A * | 10/1975 | Thelen .................. G02B 5/285 359/359 |
| 6,280,848 B1 * | 8/2001 | Okumura ............. C03C 17/3417 359/359 |
| 6,441,964 B1 * | 8/2002 | Chu et al. .................... 359/585 |
| 6,574,039 B1 * | 6/2003 | Murata ................. B82Y 10/00 355/67 |
| 2005/0225730 A1 * | 10/2005 | Sannohe .............. G02B 5/0833 353/31 |
| 2008/0239496 A1 * | 10/2008 | Akiya ........................... 359/588 |
| 2010/0321770 A1 * | 12/2010 | Pyo et al. ..................... 359/359 |

* cited by examiner

*Primary Examiner* — Bumsuk Won
*Assistant Examiner* — Balram Parbadia
(74) *Attorney, Agent, or Firm* — CKC & Partners Co., Ltd.

(57) ABSTRACT

An infrared filter includes a transparent substrate, and an infrared-filtering multilayer film. The infrared-filtering multilayer film is coated on the transparent substrate, and the infrared-filtering multilayer film includes a plurality of the first kind of film layers, a plurality of the second kind of film layers, a plurality of the third kind of film layers and a plurality of the fourth kind of film layers, wherein the four kinds of film layers are arranged in order of gradient refractive indexes. At least two kinds of film layers are made of composite materials.

4 Claims, 4 Drawing Sheets

INFRARED FILTER

RELATED APPLICATIONS

This application claims priority to Taiwan Application Serial Number 102131588 filed Sep. 2, 2013, which is incorporated by reference herein in its entirety.

BACKGROUND

Technical Field

The present disclosure relates to a filter. More particularly, the present disclosure relates to a filter for filtering infrared light.

Description of Related Art

Conventional optical systems constitute a set of lens elements and an image sensor, wherein the set of lens elements is disposed at an object side of the optical system and the image sensor is disposed at an image side of the optical system. Since the image sensor has high sensitivity to the infrared light, the infrared light thus may washout the color response in the visible spectrum and thus may distort the image color reproduction. Conventional infrared filter filters out the infrared light by applying alternate film layers of high refractive index (for example, $TiO_2$, $Ta_2O_5$ or $Nb_2O_5$) and low refractive index materials (for example, $SiO_2$ or $MgF_2$).

In recent years, as the optical systems of the electronic products have gradually evolved toward compact size and wide viewing angle, the total track length of the optical systems has to be reduced and the chief ray angle also has to be large. Moreover, the conventional infrared filter tends to produce color shift in a peripheral region of an image as the chief ray angle becomes larger. Especially, when it is coated a multilayer with a high layer count, it tends to produce warpage due to uneven internal stress.

SUMMARY

According to one aspect of the present disclosure, an infrared filter includes a transparent substrate, and an infrared-filtering multilayer film. The infrared-filtering multilayer film is coated on the transparent substrate, and the to infrared-filtering multilayer film includes a plurality of the first kind of film layers, a plurality of the second kind of film layers, a plurality of the third kind of film layers and a plurality of the fourth kind of film layers, wherein the four kinds of film layers are arranged in order of gradient refractive indexes. At least two kinds of film layers are made of composite materials. When a refractive index of the first kind of film layers is NA, a refractive index of the second kind of film layers is NB, a refractive index of the third kind of film layers is NC, a refractive index of the fourth kind of film layers is ND, and a total number of the film layers of the infrared-filtering multilayer film is TL, the following conditions are satisfied:

$2.2 \leq NA < 2.4$;

$1.9 \leq NB < 2.2$;

$1.6 \leq NC < 1.9$;

$1.4 \leq ND < 1.6$, and $80 \leq TL$.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
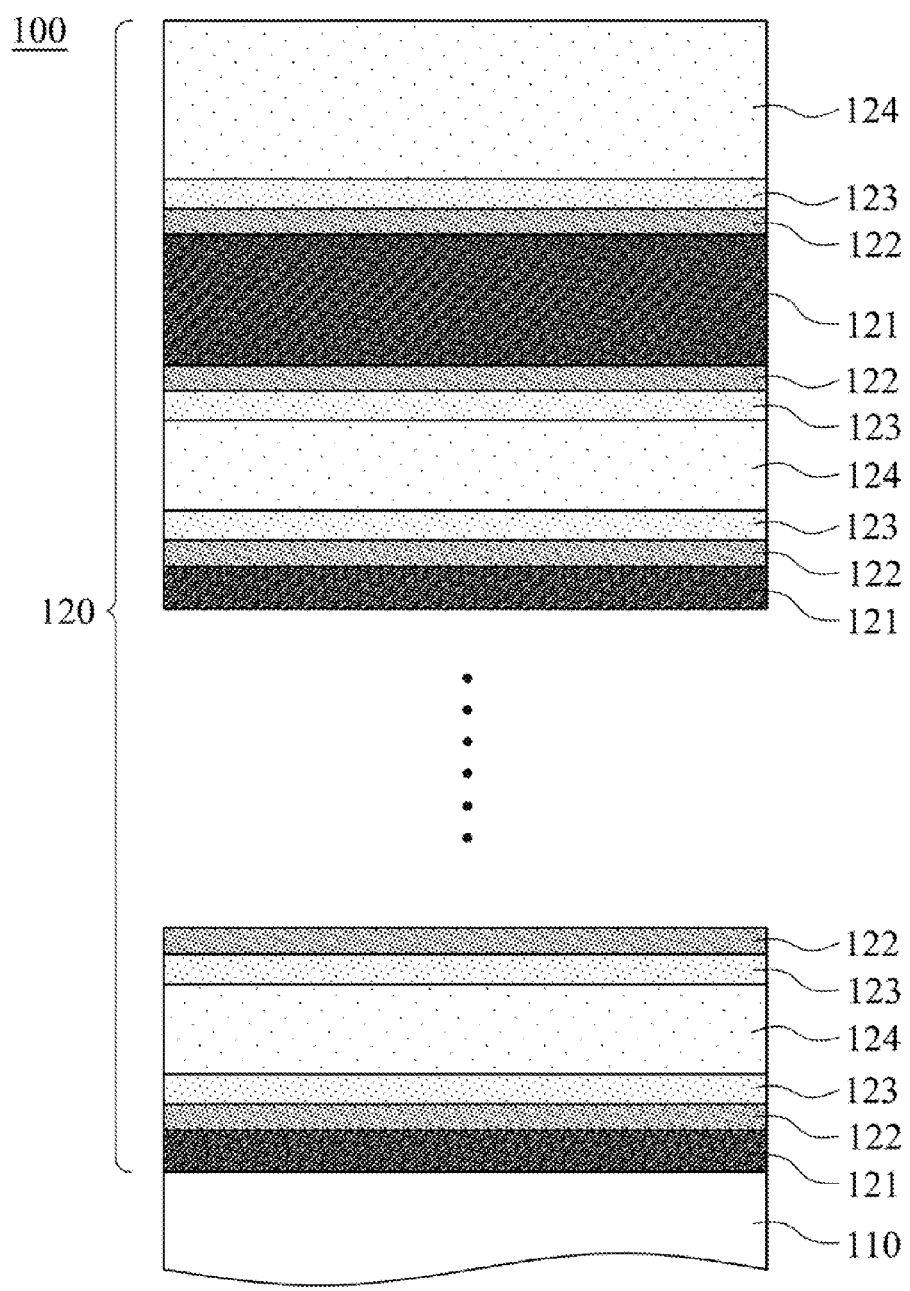
FIG. 1 is a schematic view of an infrared filter according to the 1st embodiment of the present disclosure.

An infrared filter includes a transparent substrate, and an infrared-filtering multilayer film. The infrared-filtering multilayer film is coated on the transparent substrate and the infrared-filtering multilayer film includes a plurality of the first kind of film layers, a plurality of the second kind of film layers, a plurality of the third kind of film layers and a plurality of the fourth kind of film layers, wherein the four kinds of film layers are arranged in order of gradient refractive indexes. At least two kinds of film layers are made of composite materials. When a refractive index of the first kind of film layers is NA, a refractive index of the second kind of film layers is NB, a refractive index of the third kind of film layers is NC, a refractive index of the fourth kind of film layers is ND, and a total number of the film layers of the infrared-filtering multilayer film is TL, the following conditions are satisfied:

$2.2 \leq NA < 2.4$;

$1.9 \leq NB < 2.2$;

$1.6 \leq NC < 1.9$;

$1.4 \leq ND < 1.6$; and $80 \leq TL$.

According to the aforementioned infrared filter, the infrared-filtering multilayer film includes at least four film layers with different refractive indexes, wherein the film layers are arranged in order of gradient refractive indexes (first from high refractive index to low refractive index then from low refractive index to high refractive index). Therefore, it is favorable for effectively reducing the color shift. Furthermore, at least two kinds of film layers are made of composite materials, and the infrared-filtering multilayer film is coated with a certain total number of film layers. Therefore, it is favorable for reducing the warpage formed on the transparent substrate and reducing the internal stress inside each of the film layer. It is also favorable for reducing the surface roughness and simplifying the manufacturing process so as to increase the manufacturing yield rate and efficiency.

According to the aforementioned composite material of the film layers may be a mixture of metal oxide and $SiO_2$. Therefore, it is favorable for reducing the warpage formed on the transparent substrate and reducing the internal stress inside each of the film layer so as to increase the manufacturing yield rate and efficiency.

When the refractive index of the first kind of film layers is NA, the refractive index of the second kind of film layers is NB, the refractive index of the third kind of film layers is NC, and the refractive index of the fourth kind of film layers is ND, the following conditions are satisfied: NA−NB≥0.1; NB−NC≥0.1; and NC−ND≥0.1. Accordingly, it is favorable for effectively filtering out the infrared light by applying adjacent film layers with relatively large difference in refractive indexes. Preferably, the following conditions are satisfied: NA−NB ≥0.15; NB−NC≥0.15; and NC−ND≥0.15.

When a decay rate of the transmittance responsivity value through the infrared filter between 554 nm and 700 nm is D, the following condition is satisfied: 1%≤D≤30%. Therefore, it is favorable for effectively improving the transmittance of incident red light so as to reduce the color shift. Preferably, the following condition is satisfied: 1%≤D≤20%.

According to the infrared filter of the present disclosure, the transparent substrate can be made of plastic or glass material. When the transparent substrate is made of plastic material, the manufacturing cost thereof can be reduced. Moreover, the infrared-filtering multilayer film can be coated on the plastic lens elements with refractive power so as to further filter out infrared light and correct color shift.

According to the infrared filter of the present disclosure, the transmittance responsivity value (TR) is defined as a sum of transmittance (X) multiplied by relative responsivity of the image sensor (Y) under a reference wavelength (between m and n) with an interval of 1 nm, and the decay rate (D) is defined as the decrease in TR at two different chief ray angles through the infrared filter under a reference wavelength, the equations are expressed as follows:

$$TR = \sum_{i=m}^{n} X_i Y_i,$$

where,
TR is transmittance responsivity value;
m is the starting wavelength;
n is the ending wavelength;
both of m and n are integer;
X is transmittance; and
Y is relative responsivity of the image sensor.

$$D = \left(1 - \frac{TR_2}{TR_1}\right) \times 100\%,$$

where,
D is the decay rate;
$TR_1$ is the transmittance responsivity when the chief ray angle is at 0 degrees;
$TR_2$ is the transmittance responsivity when the chief ray angle is at 30 degrees;
It will be apparent to those skilled in the art that the aforementioned decay rate is the decay rate of the infrared filter of the present disclosure.

According to the infrared filter of the present disclosure, each film layer of the infrared-filtering multilayer film coated on the transparent substrate may be coated using different techniques such as evaporation or sputtering.

According to the above description of the present disclosure, the following 1st-2nd specific embodiments are provided for further explanation.

1st Embodiment

FIG. 1 is a schematic view of an infrared filter 100 according to the 1st embodiment of the present disclosure. In FIG. 1, the infrared filter 100 includes a transparent substrate 110, and an infrared-filtering multilayer film 120. The infrared-filtering multilayer film 120 is coated on the transparent substrate 110 and includes four kinds of film layers (121-124) with different refractive indexes, wherein the aforementioned four kinds of film layers (121-124) are arranged in order of gradient refractive indexes.

Specifically, the transparent substrate 110 is made of glass material (B270-1) with a refractive index of 1.5081

In the infrared-filtering multilayer film 120, the four kinds of film layers (121-124) with different refractive indexes are the first kind of film layers 121, the second kind of film layers 122, the third kind, of film layers 123, and the fourth kind of film layers 124, and each kind includes of more than one layer in the infrared-filtering multilayer film 120. A refractive index of the first kind of film layers 121 is NA, a refractive index of the second kind of film layers 122 is NB, a refractive index of the third kind of film layers 123 is NC, and a refractive index of the fourth kind of film layers 124 is ND.

In the 1st embodiment, the infrared-filtering multilayer film 120 includes two main types of film layers: the second kind of film layers 122 and the third kind of film layers 123 are both made from mixtures of $Nb_2O_5$ and $SiO_2$; however, the first kind of film layers 121 and the fourth kind of film layers 124 are made of one single material. The materials and proportions of mixture are shown in Table 1.

TABLE 1

(1st Embodiment)

| Type of Film Layer | | Material A | Proportion of Material A | Material B | Proportion of Material B |
|---|---|---|---|---|---|
| first kind of film layer | 121 | $Nb_2O_5$ | 1 | $SiO_2$ | 0 |
| second kind of film layer | 122 | $Nb_2O_5$ | 2 | $SiO_2$ | 1 |
| third kind of film layer | 123 | $Nb_2O_5$ | 1 | $SiO_2$ | 2 |
| fourth kind of film layer | 124 | $Nb_2O_5$ | 0 | $SiO_2$ | 1 |

In Table 2, according to the 1st embodiment, a total number of the film layers of the infrared-filtering multilayer film 120 (that is a total number of the first kind of film layers 121, the second kind of film layers 122, the third kind of film layers 123 and the fourth kind of film layers 124) is TL, and the TL is 118. The four kinds of film layers (121-124) of the infrared-filtering multilayer film 120 are arranged in order of gradient refractive indexes, first in descending order of refractive index, starting from the first kind of film layer 121 which is of the highest refractive index and closest to the transparent substrate 110 to the film layer of the lowest refractive index, then in ascending order of refractive index, starting from the film layer of the lowest refractive index to the first kind of film layer 121 of the highest refractive index.

Moreover, the refractive index of the first kind of film layers 121 is NA, the refractive index of the second kind of film layers 122 is NB, the refractive index of the third kind of film: layers 123 is NC, and the refractive index of the fourth kind of film layers 124 is ND, the following conditions are satisfied: NA−NB=0.2886; NB−NC=0.2885; and NC−ND=0.2885.

TABLE 2

(1st Embodiment)

| No. | Type of Film Layer | | Thickness (nm) | Refractive Index | |
|---|---|---|---|---|---|
| 1 | first kind of film layer | 121 | 4.48 | NA | 2.3436 |
| 2 | second kind of film layer | 122 | 2.72 | NB | 2.055 |
| 3 | third kind of film layer | 123 | 3.16 | NC | 1.7665 |
| 4 | fourth kind of film layer | 124 | 37.99 | ND | 1.4780 |
| 5 | third kind of film layer | 123 | 3.16 | NC | 1.7665 |
| 6 | second kind of film layer | 122 | 2.72 | NB | 2.055 |
| 7 | first kind of film layer | 121 | 109.21 | NA | 2.3436 |
| 8 | second kind of film layer | 122 | 2.72 | NB | 2.055 |
| 9 | third kind of film layer | 123 | 3.16 | NC | 1.7665 |
| 10 | fourth kind of film layer | 124 | 198.88 | ND | 1.4780 |
| 11 | third kind of film layer | 123 | 3.16 | NC | 1.7665 |
| 12 | second kind of film layer | 122 | 2.72 | NB | 2.055 |
| 13 | first kind of film layer | 121 | 14.68 | NA | 2.3436 |
| 14 | second kind of film layer | 122 | 2.72 | NB | 2.055 |
| 15 | third kind of film layer | 123 | 3.16 | NC | 1.7665 |
| 16 | fourth kind of film layer | 124 | 217.49 | ND | 1.4780 |
| 17 | third kind of film layer | 123 | 3.16 | NC | 1.7665 |
| 18 | second kind of film layer | 122 | 2.72 | NB | 2.055 |
| 19 | first kind of film layer | 121 | 17.04 | NA | 2.3436 |
| 20 | second kind of film layer | 122 | 2.72 | NB | 2.055 |
| 21 | third kind of film layer | 123 | 3.16 | NC | 1.7665 |
| 22 | fourth kind of film layer | 124 | 210.02 | ND | 1.4780 |
| 23 | third kind of film layer | 123 | 3.16 | NC | 1.7665 |
| 24 | second kind of film layer | 122 | 2.72 | NB | 2.055 |
| 25 | first kind of film layer | 121 | 20.69 | NA | 2.3436 |
| 26 | second kind of film layer | 122 | 2.72 | NB | 2.055 |
| 27 | third kind of film layer | 123 | 3.16 | NC | 1.7665 |
| 28 | fourth kind of film layer | 124 | 205.36 | ND | 1.4780 |
| 29 | third kind of film layer | 123 | 3.16 | NC | 1.7665 |
| 30 | second kind of film layer | 122 | 2.72 | NB | 2.055 |
| 31 | first kind of film layer | 121 | 21.48 | NA | 2.3436 |
| 32 | second kind of film layer | 122 | 2.72 | NB | 2.055 |
| 33 | third kind of film layer | 123 | 3.16 | NC | 1.7665 |
| 34 | fourth kind of film layer | 124 | 206.72 | ND | 1.4780 |
| 35 | third kind of film layer | 123 | 3.16 | NC | 1.7665 |
| 36 | second kind of film layer | 122 | 2.72 | NB | 2.055 |
| 37 | first kind of film layer | 121 | 20.11 | NA | 2.3436 |
| 38 | second kind of film layer | 122 | 2.72 | NB | 2.055 |
| 39 | third kind of film layer | 123 | 3.16 | NC | 1.7665 |
| 40 | fourth kind of film layer | 124 | 201.89 | ND | 1.4780 |
| 41 | third kind of film layer | 123 | 3.16 | NC | 1.7665 |
| 42 | second kind of film layer | 122 | 2.72 | NB | 2.055 |
| 43 | first kind of film layer | 121 | 29.07 | NA | 2.3436 |
| 44 | second kind of film layer | 122 | 2.72 | NB | 2.055 |
| 45 | third kind of film layer | 123 | 3.16 | NC | 1.7665 |
| 46 | fourth kind of film layer | 124 | 33.72 | ND | 1.4780 |
| 47 | third kind of film layer | 123 | 3.16 | NC | 1.7665 |
| 48 | second kind of film layer | 122 | 2.72 | NB | 2.055 |
| 49 | first kind of film layer | 121 | 4.5 | NA | 2.3436 |
| 50 | second kind of film layer | 122 | 2.72 | NB | 2.055 |
| 51 | third kind of film layer | 123 | 3.16 | NC | 1.7665 |
| 52 | fourth kind of film layer | 124 | 128.95 | ND | 1.4780 |
| 53 | third kind of film layer | 123 | 3.16 | NC | 1.7665 |
| 54 | second kind of film layer | 122 | 2.72 | NB | 2.055 |
| 55 | first kind of film layer | 121 | 110.34 | NA | 2.3436 |
| 56 | second kind of film layer | 122 | 2.72 | NB | 2.055 |
| 57 | third kind of film layer | 123 | 3.16 | NC | 1.7665 |
| 58 | fourth kind of film layer | 124 | 16.25 | ND | 1.4780 |
| 59 | third kind of film layer | 123 | 3.16 | NC | 1.7665 |
| 60 | second kind of film layer | 122 | 2.72 | NB | 2.055 |
| 61 | first kind of film layer | 121 | 121.76 | NA | 2.3436 |
| 62 | second kind of film layer | 122 | 2.72 | NB | 2.055 |
| 63 | third kind of film layer | 123 | 3.16 | NC | 1.7665 |
| 64 | fourth kind of film layer | 124 | 17.24 | ND | 1.4780 |
| 65 | third kind of film layer | 123 | 3.16 | NC | 1.7665 |
| 66 | second kind of film layer | 122 | 2.72 | NB | 2.055 |
| 67 | first kind of film layer | 121 | 124.08 | NA | 2.3436 |
| 68 | second kind of film layer | 122 | 2.72 | NB | 2.055 |
| 69 | third kind of film layer | 123 | 3.16 | NC | 1.7665 |
| 70 | fourth kind of film layer | 124 | 26.39 | ND | 1.4780 |
| 71 | third kind of film layer | 123 | 3.16 | NC | 1.7665 |
| 72 | second kind of film layer | 122 | 2.72 | NB | 2.055 |
| 73 | first kind of film layer | 121 | 122.34 | NA | 2.3436 |
| 74 | second kind of film layer | 122 | 2.72 | NB | 2.055 |
| 75 | third kind of film layer | 123 | 3.16 | NC | 1.7665 |
| 76 | fourth kind of film layer | 124 | 34.05 | ND | 1.4780 |
| 77 | third kind of film layer | 123 | 3.16 | NC | 1.7665 |
| 78 | second kind of film layer | 122 | 2.72 | NB | 2.055 |
| 79 | first kind of film layer | 121 | 120.37 | NA | 2.3436 |
| 80 | second kind of film layer | 122 | 2.72 | NB | 2.055 |
| 81 | third kind of film layer | 123 | 3.16 | NC | 1.7665 |
| 82 | fourth kind of film layer | 124 | 36.76 | ND | 1.4780 |
| 83 | third kind of film layer | 123 | 3.16 | NC | 1.7665 |
| 84 | second kind of film layer | 122 | 2.72 | NB | 2.055 |
| 85 | first kind of film layer | 121 | 120.68 | NA | 2.3436 |
| 86 | second kind of film layer | 122 | 2.72 | NB | 2.055 |
| 87 | third kind of film layer | 123 | 3.16 | NC | 1.7665 |
| 88 | fourth kind of film layer | 124 | 33.69 | ND | 1.4780 |
| 89 | third kind of film layer | 123 | 3.16 | NC | 1.7665 |
| 90 | second kind of film layer | 122 | 2.72 | NB | 2.055 |
| 91 | first kind of film layer | 121 | 123.68 | NA | 2.3436 |
| 92 | second kind of film layer | 122 | 2.72 | NB | 2.055 |
| 93 | third kind of film layer | 123 | 3.16 | NC | 1.7665 |
| 94 | fourth kind of film layer | 124 | 26.94 | ND | 1.4780 |
| 95 | third kind of film layer | 123 | 3.16 | NC | 1.7665 |
| 96 | second kind of film layer | 122 | 2.72 | NB | 2.055 |
| 97 | first kind of film layer | 121 | 127.53 | NA | 2.3436 |
| 98 | second kind of film layer | 122 | 2.72 | NB | 2.055 |
| 99 | third kind of film layer | 123 | 3.16 | NC | 1.7665 |
| 100 | fourth kind of film layer | 124 | 19.1 | ND | 1.4780 |
| 101 | third kind of film layer | 123 | 3.16 | NC | 1.7665 |
| 102 | second kind of film layer | 122 | 2.72 | NB | 2.055 |
| 103 | first kind of film layer | 121 | 130.56 | NA | 2.3436 |
| 104 | second kind of film layer | 122 | 2.72 | NB | 2.055 |
| 105 | third kind of film layer | 123 | 3.16 | NC | 1.7665 |
| 106 | fourth kind of film layer | 124 | 12.92 | ND | 1.4780 |
| 107 | third kind of film layer | 123 | 3.16 | NC | 1.7665 |
| 108 | second kind of film layer | 122 | 2.72 | NB | 2.055 |
| 109 | first kind of film layer | 121 | 129.86 | NA | 2.3436 |
| 110 | second kind of film layer | 122 | 2.72 | NB | 2.055 |
| 111 | third kind of film layer | 123 | 3.16 | NC | 1.7665 |
| 112 | fourth kind of film layer | 124 | 13.73 | ND | 1.4780 |
| 113 | third kind of film layer | 123 | 3.16 | NC | 1.7665 |
| 114 | second kind of film layer | 122 | 2.72 | NB | 2.055 |
| 115 | first kind of film layer | 121 | 112.99 | NA | 2.3436 |
| 116 | second kind of film layer | 122 | 2.72 | NB | 2.055 |
| 117 | third kind of film layer | 123 | 3.16 | NC | 1.7665 |
| 118 | fourth kind of film layer | 124 | 83.52 | ND | 1.4780 |

Figure 3:
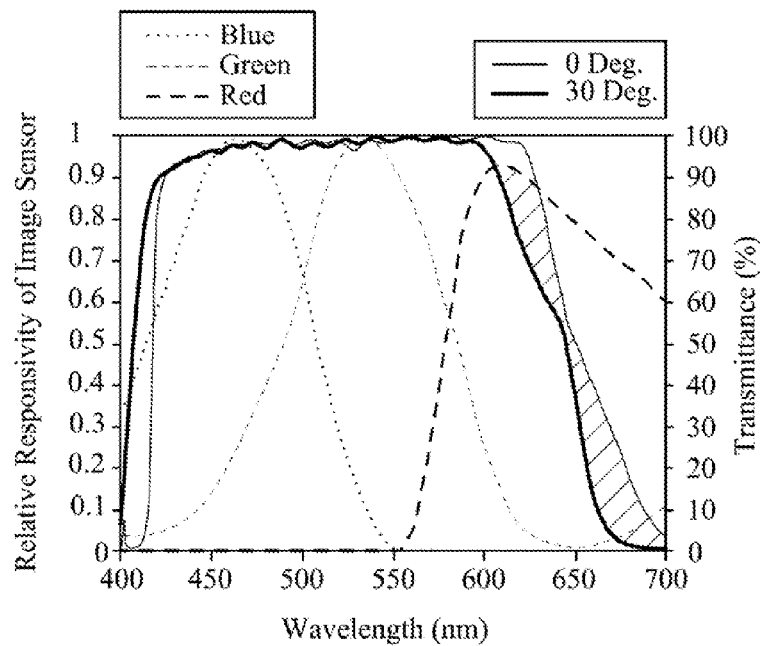
FIG. 3 shows transmittance and relative responsivity spectrum of an infrared filter of FIG. 1 according to the 1st embodiment of the present disclosure.

FIG. 3 together shows a transmittance and relative responsivity spectrum of the infrared filter 100 according to FIG. 1 and the hatched region of FIG. 3 represents the difference in the transmittance responsivity values within the wavelength range of 554 nm to 700 nm (between chief ray angles of 0 degrees and 30 degrees as shown in Table 3).

TABLE 3

(1st Embodiment)

| | Chief Ray Angles (deg.) | Blue Light | Green Light | Red Light |
|---|---|---|---|---|
| | | Transmittance Responsivity Value | | |
| Infrared Filter 100 | 0 | 80.24 | 100.04 | 67.29 |
| | 30 | 84.43 | 99.75 | 54.62 |
| | | Decay Rate (%) | | |
| | | −5.22 | 0.29 | 18.82 |

2nd Embodiment

Figure 2:
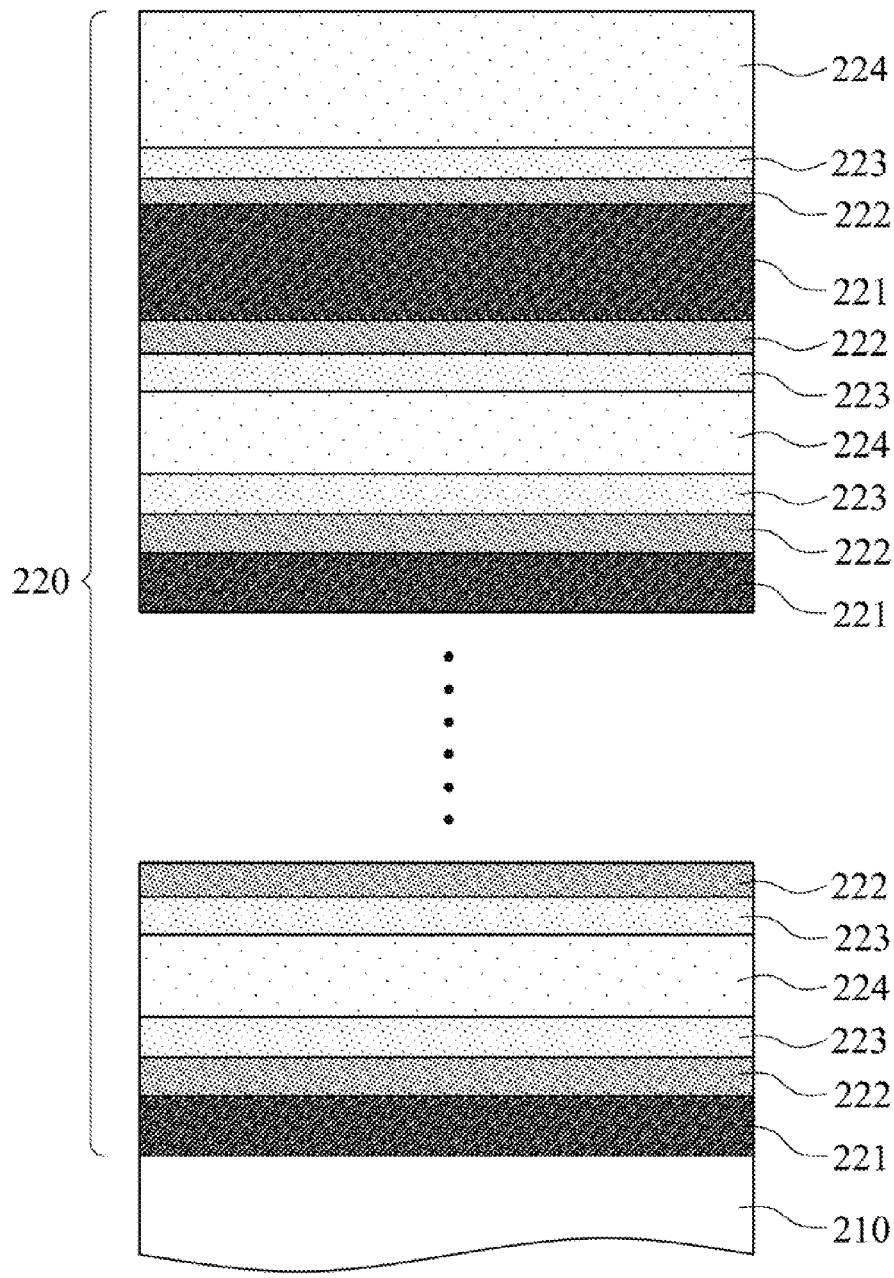
FIG. 2 is a schematic view of an infrared filter according to the 2nd embodiment of the present disclosure.

FIG. 2 is a schematic view of an infrared filter 200 according to the 2nd embodiment of the present disclosure. In FIG. 2, the infrared filter 200 includes a transparent substrate 210, and an infrared-filtering multilayer film 220. The infrared-filtering multilayer film 220 is coated on the transparent substrate 210 and includes four kinds of film layers (221-224) with different refractive indexes, wherein the aforementioned four kinds of film layers (221-224) are arranged in order of gradient refractive indexes Specifically, the transparent substrate 210 is made of glass material (B270-1) with a refractive index of 1.5081.

In the infrared-filtering multilayer film 220, the four kinds of film layers (221-224) with different refractive indexes are the first kind of film layers 221, the second kind of film layers 222, the third kind of film layers 223, and the fourth kind of film layers 224, and each kind includes of more than one layer in the infrared-filtering multilayer film 220. A refractive index of the first kind of film layers 221 is NA, a refractive index of the second kind of film layers 222 is NB, a refractive index of the third kind of film layers 223 is NC, and a refractive index of the fourth kind of film layers 224 is ND.

In the 2nd embodiment, the infrared-filtering multilayer film 220 includes two main types of film layers: the second kind of film layers 222 and the third kind of film layers 223 are both made from mixtures of $Nb_2O_5$ and $SiO_2$; however, the first kind of film layers 221 and the fourth kind of film layers 224 are made of one single material. The materials and proportions of mixture are shown in Table 4.

TABLE 4

(2nd Embodiment)

| Type of Film Layer | | Material A | Proportion of Material A | Material B | Proportion of Material B |
|---|---|---|---|---|---|
| first kind of film layer | 221 | $Nb_2O_5$ | 1 | $SiO_2$ | 0 |
| second kind of film layer | 222 | $Nb_2O_5$ | 2 | $SiO_2$ | 1 |
| third kind of film layer | 223 | $Nb_2O_5$ | 1 | $SiO_2$ | 2 |
| fourth kind of film layer | 224 | $Nb_2O_5$ | 0 | $SiO_2$ | 1 |

In Table 5, according to the 2nd embodiment, a total number of the film layers of the infrared-filtering multilayer film 220 (that is a total number of the first kind of film layers 221, the second kind of film layers 222, the third kind of film layers 223 and the fourth kind of film layers 224) is TL, and the TL is 82. The four kinds of film layers (221-224) of the infrared-filtering multilayer film 220 are arranged in order of gradient refractive indexes, first in descending order of refractive index, starting from the first kind of film layer 221 which is of the highest refractive index and closest to the transparent substrate 210 to the film layer of the lowest refractive index, then in ascending order of refractive index, starting from the film layer of the lowest refractive index to the first kind of film layer 221 of the highest refractive index.

Moreover, the refractive index of the first kind of film layers 221 is NA, the refractive index of the second kind of film layers 222 is NB, the refractive index of the third kind of film layers 223 is NC, and the refractive index of the fourth kind of film layers 224 is ND, the following conditions are satisfied: NA−NB=0.2884; NB−NC=0.2883; and NC−ND=0.2884.

TABLE 5

(2nd Embodiment)

| No. | Type of Film Layer | | Thickness (nm) | Refractive Index | |
|---|---|---|---|---|---|
| 1 | first kind of film layer | 221 | 4.85 | NA | 2.343 |
| 2 | second kind of film layer | 222 | 3.1 | NB | 2.0546 |
| 3 | third kind of film layer | 223 | 3.34 | NC | 1.7663 |
| 4 | fourth kind of film layer | 224 | 19.83 | ND | 1.4779 |
| 5 | third kind of film layer | 223 | 3.18 | NC | 1.7663 |
| 6 | second kind of film layer | 222 | 2.53 | NB | 2.0546 |
| 7 | first kind of film layer | 221 | 93.45 | NA | 2.343 |
| 8 | second kind of film layer | 222 | 2.11 | NB | 2.0546 |
| 9 | third kind of film layer | 223 | 2.59 | NC | 1.7663 |
| 10 | fourth kind of film layer | 224 | 184.68 | ND | 1.4779 |
| 11 | third kind of film layer | 223 | 2.84 | NC | 1.7663 |
| 12 | second kind of film layer | 222 | 2.31 | NB | 2.0546 |
| 13 | first kind of film layer | 221 | 13.53 | NA | 2.343 |
| 14 | second kind of film layer | 222 | 2.16 | NB | 2.0546 |
| 15 | third kind of film layer | 223 | 2.68 | NC | 1.7663 |
| 16 | fourth kind of film layer | 224 | 207.98 | ND | 1.4779 |
| 17 | third kind of film layer | 223 | 2.73 | NC | 1.7663 |
| 18 | second kind of film layer | 222 | 2.16 | NB | 2.0546 |
| 19 | first kind of film layer | 221 | 14.56 | NA | 2.343 |
| 20 | second kind of film layer | 222 | 2.24 | NB | 2.0546 |
| 21 | third kind of film layer | 223 | 2.97 | NC | 1.7663 |
| 22 | fourth kind of film layer | 224 | 192.05 | ND | 1.4779 |
| 23 | third kind of film layer | 223 | 2.42 | NC | 1.7663 |
| 24 | second kind of film layer | 222 | 1.44 | NB | 2.0546 |
| 25 | first kind of film layer | 221 | 54.33 | NA | 2.343 |
| 26 | second kind of film layer | 222 | 1.79 | NB | 2.0546 |
| 27 | third kind of film layer | 223 | 2.76 | NC | 1.7663 |
| 28 | fourth kind of film layer | 224 | 18.96 | ND | 1.4779 |
| 29 | third kind of film layer | 223 | 3.03 | NC | 1.7663 |
| 30 | second kind of film layer | 222 | 2.24 | NB | 2.0546 |
| 31 | first kind of film layer | 221 | 15.07 | NA | 2.343 |
| 32 | second kind of film layer | 222 | 2.36 | NB | 2.0546 |
| 33 | third kind of film layer | 223 | 3.27 | NC | 1.7663 |
| 34 | fourth kind of film layer | 224 | 98.46 | ND | 1.4779 |
| 35 | third kind of film layer | 223 | 2.54 | NC | 1.7663 |
| 36 | second kind of film layer | 222 | 1.75 | NB | 2.0546 |
| 37 | first kind of film layer | 221 | 108.86 | NA | 2.343 |
| 38 | second kind of film layer | 222 | 2.45 | NB | 2.0546 |
| 39 | third kind of film layer | 223 | 2.92 | NC | 1.7663 |
| 40 | fourth kind of film layer | 224 | 40.54 | ND | 1.4779 |
| 41 | third kind of film layer | 223 | 2.57 | NC | 1.7663 |
| 42 | second kind of film layer | 222 | 2.11 | NB | 2.0546 |
| 43 | first kind of film layer | 221 | 118.93 | NA | 2.343 |
| 44 | second kind of film layer | 222 | 2.42 | NB | 2.0546 |
| 45 | third kind of film layer | 223 | 2.89 | NC | 1.7663 |
| 46 | fourth kind of film layer | 224 | 40.55 | ND | 1.4779 |
| 47 | third kind of film layer | 223 | 2.58 | NC | 1.7663 |
| 48 | second kind of film layer | 222 | 2.08 | NB | 2.0546 |
| 49 | first kind of film layer | 221 | 118.93 | NA | 2.343 |
| 50 | second kind of film layer | 222 | 2.34 | NB | 2.0546 |
| 51 | third kind of film layer | 223 | 2.9 | NC | 1.7663 |
| 52 | fourth kind of film layer | 224 | 42.01 | ND | 1.4779 |
| 53 | third kind of film layer | 223 | 2.78 | NC | 1.7663 |
| 54 | second kind of film layer | 222 | 2.25 | NB | 2.0546 |
| 55 | first kind of film layer | 221 | 118.76 | NA | 2.343 |
| 56 | second kind of film layer | 222 | 2.21 | NB | 2.0546 |
| 57 | third kind of film layer | 223 | 2.65 | NC | 1.7663 |
| 58 | fourth kind of film layer | 224 | 40.74 | ND | 1.4779 |
| 59 | third kind of film layer | 223 | 2.73 | NC | 1.7663 |
| 60 | second kind of film layer | 222 | 2.33 | NB | 2.0546 |
| 61 | first kind of film layer | 221 | 120.36 | NA | 2.343 |
| 62 | second kind of film layer | 222 | 2.22 | NB | 2.0546 |
| 63 | third kind of film layer | 223 | 2.61 | NC | 1.7663 |
| 64 | fourth kind of film layer | 224 | 36.06 | ND | 1.4779 |
| 65 | third kind of film layer | 223 | 2.77 | NC | 1.7663 |
| 66 | second kind of film layer | 222 | 2.36 | NB | 2.0546 |
| 67 | first kind of film layer | 221 | 123.31 | NA | 2.343 |
| 68 | second kind of film layer | 222 | 2.11 | NB | 2.0546 |
| 69 | third kind of film layer | 223 | 2.5 | NC | 1.7663 |
| 70 | fourth kind of film layer | 224 | 28.17 | ND | 1.4779 |
| 71 | third kind of film layer | 223 | 2.74 | NC | 1.7663 |
| 72 | second kind of film layer | 222 | 2.39 | NB | 2.0546 |
| 73 | first kind of film layer | 221 | 125.34 | NA | 2.343 |
| 74 | second kind of film layer | 222 | 2.09 | NB | 2.0546 |
| 75 | third kind of film layer | 223 | 2.39 | NC | 1.7663 |

TABLE 5-continued (2nd Embodiment)

| No. | Type of Film Layer | Thickness (nm) | | Refractive Index |
|---|---|---|---|---|
| 76 | fourth kind of film layer 224 | 19.82 | ND | 1.4779 |
| 77 | third kind of film layer 223 | 2.64 | NC | 1.7663 |
| 78 | second kind of film layer 222 | 2.47 | NB | 2.0546 |
| 79 | first kind of film layer 221 | 104.03 | NA | 2.343 |
| 80 | second kind of film layer 222 | 1.32 | NB | 2.0546 |
| 81 | third kind of film layer 223 | 1.4 | NC | 1.7663 |
| 82 | fourth kind of film layer 224 | 71.26 | ND | 1.4779 |

Figure 4:
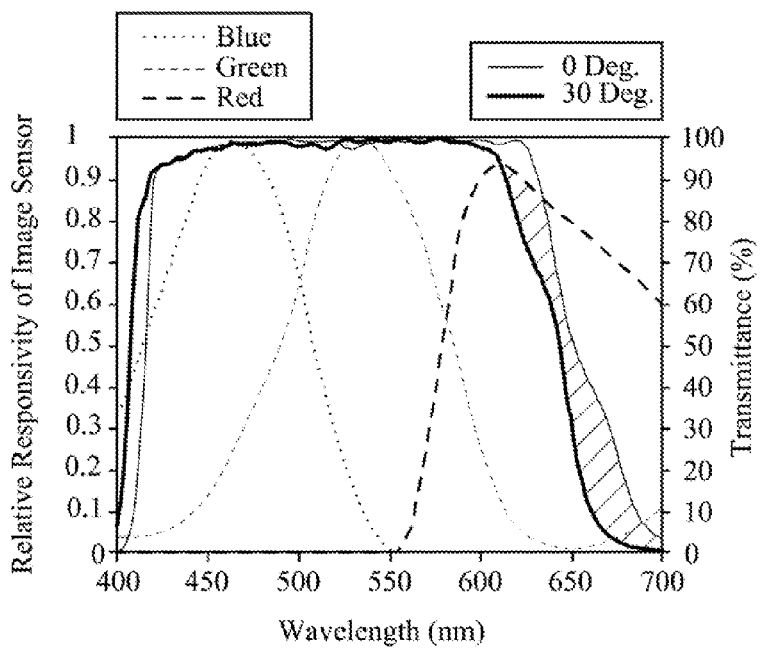
FIG. 4 shows transmittance and relative responsivity spectrum of an infrared filter of FIG. 2 according to the 2nd embodiment of the present disclosure.

FIG. 4 together shows a transmittance and relative responsivity spectrum of the infrared filter 200 according to FIG. 2, and the hatched region of FIG. 4 represents the difference in the transmittance responsivity values within the wavelength range of 554 nm to 700 nm (between chief ray angles of 0 degrees and 30 degrees as shown in Table 6).

TABLE 6

(2nd Embodiment)

| | Chief Ray Angles (deg.) | Blue Light | Green Light | Red Light |
|---|---|---|---|---|
| | | Transmittance Responsivity Value | | |
| Infrared Filter 200 | 0 | 82.18 | 100.46 | 68.75 |
| | 30 | 85.09 | 100.04 | 55.84 |
| | | Decay Rate (%) | | |
| | | −3.53 | 0.41 | 18.77 |

COMPARATIVE EXAMPLE

An exemplified infrared filter is a transparent substrate with two different to kinds of dielectric layers alternately stacked and coated on the transparent substrate which is made of glass material (B270-1), wherein the total number of layers of the stack is 44. Furthermore, the material, the refractive index and the thickness of each layer of the exemplified infrared filter, numbered 1 to 44 in ascending order, starting from the layer closest to the transparent substrate to the layer closest to air are shown in Table 7.

TABLE 7

(Comparative Example)

| No. | Material | Refractive Index | Thickness (nm) |
|---|---|---|---|
| 1 | $TiO_2$ | 2.5 | 10.10 |
| 2 | $SiO_2$ | 1.48 | 39.35 |
| 3 | $TiO_2$ | 2.5 | 110.81 |
| 4 | $SiO_2$ | 1.48 | 181.86 |
| 5 | $TiO_2$ | 2.5 | 112.55 |
| 6 | $SiO_2$ | 1.48 | 186.16 |
| 7 | $TiO_2$ | 2.5 | 112.48 |
| 8 | $SiO_2$ | 1.48 | 185.14 |
| 9 | $TiO_2$ | 2.5 | 106.86 |
| 10 | $SiO_2$ | 1.48 | 172.93 |
| 11 | $TiO_2$ | 2.5 | 103.88 |
| 12 | $SiO_2$ | 1.48 | 179.78 |
| 13 | $TiO_2$ | 2.5 | 111.11 |
| 14 | $SiO_2$ | 1.48 | 190.52 |
| 15 | $TiO_2$ | 2.5 | 112.82 |
| 16 | $SiO_2$ | 1.48 | 188.36 |
| 17 | $TiO_2$ | 2.5 | 113.74 |
| 18 | $SiO_2$ | 1.48 | 166.75 |
| 19 | $TiO_2$ | 2.5 | 80.53 |

TABLE 7-continued (Comparative Example)

| No. | Material | Refractive Index | Thickness (nm) |
|---|---|---|---|
| 20 | $SiO_2$ | 1.48 | 148.44 |
| 21 | $TiO_2$ | 2.5 | 74.86 |
| 22 | $SiO_2$ | 1.48 | 146.94 |
| 23 | $TiO_2$ | 2.5 | 78.54 |
| 24 | $SiO_2$ | 1.48 | 165.85 |
| 25 | $TiO_2$ | 2.5 | 113.86 |
| 26 | $SiO_2$ | 1.48 | 169.28 |
| 27 | $TiO_2$ | 2.5 | 76.78 |
| 28 | $SiO_2$ | 1.48 | 149.88 |
| 29 | $TiO_2$ | 2.5 | 65.21 |
| 30 | $SiO_2$ | 1.48 | 153.87 |
| 31 | $TiO_2$ | 2.5 | 59.95 |
| 32 | $SiO_2$ | 1.48 | 156.91 |
| 33 | $TiO_2$ | 2.5 | 58.70 |
| 34 | $SiO_2$ | 1.48 | 155.54 |
| 35 | $TiO_2$ | 2.5 | 61.63 |
| 36 | $SiO_2$ | 1.48 | 150.66 |
| 37 | $TiO_2$ | 2.5 | 66.67 |
| 38 | $SiO_2$ | 1.48 | 146.84 |
| 39 | $TiO_2$ | 2.5 | 72.58 |
| 40 | $SiO_2$ | 1.48 | 152.17 |
| 41 | $TiO_2$ | 2.5 | 98.53 |
| 42 | $SiO_2$ | 1.48 | 10.55 |
| 43 | $TiO_2$ | 2.5 | 102.18 |
| 44 | $SiO_2$ | 1.48 | 79.30 |

The decay rate and the transmittance responsivity value of the exemplified infrared filter at two different chief ray angles (0° and 30°) are shown in Table 8.

TABLE 8

(Comparative Example)

| | Chief Ray Angles (deg.) | Blue Light | Green Light | Red Light |
|---|---|---|---|---|
| | | Transmittance Responsivity Value | | |
| Infrared Filter of Comparative Example | 0 | 83.32 | 97.20 | 63.93 |
| | 30 | 82.85 | 94.32 | 42.82 |
| | | Decay Rate (%) | | |
| | | 0.56 | 2.95 | 33.02 |

Figure 5:
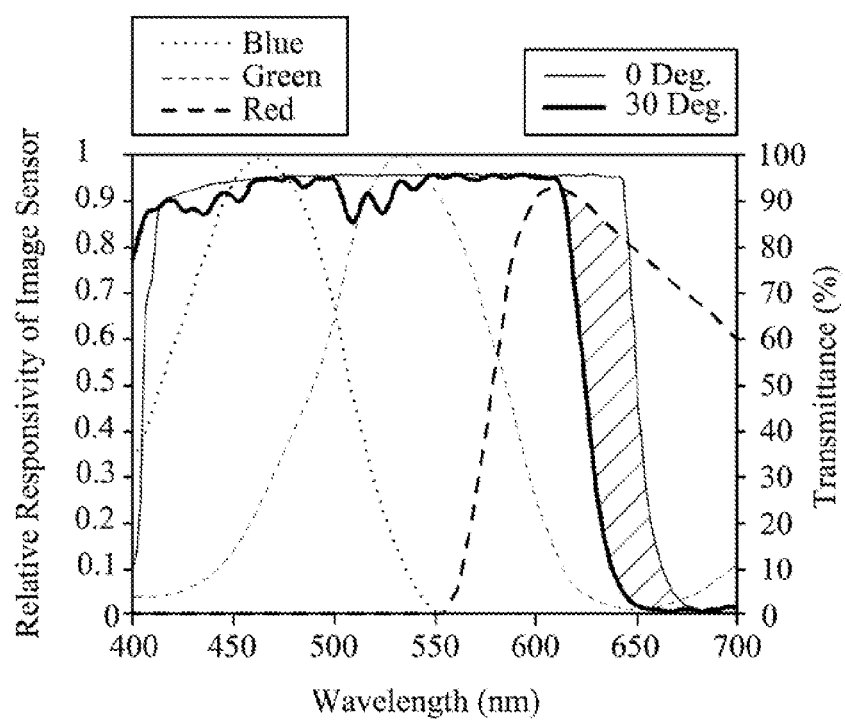
FIG. 5 shows transmittance and relative responsivity spectrum of an infrared filter according to the comparative example.

FIG. 5 together shows a transmittance and relative responsivity spectrum of the exemplified infrared filter, and the hatched region of FIG. 5 represents the difference in the transmittance responsivity values within the wavelength range of 554 nm to 700 nm (between chief ray angles of 0 degrees and 30 degrees as shown in Table 8).

In Table 8 and FIG. 5, when the exemplified infrared filter is at chief ray angles of 0 degrees and 30 degrees, the decay rates of the blue light and green light are about 0.56% and 2.95% respectively, and the red light is as high as around 33.02% (especially between 554 nm and 700 nm). Nevertheless, the decay rates of the infrared filter of every embodiment in this present disclosure are not that high under the same test conditions. The decay rate of the blue light is only around −5.22% and −3.53, the decay rate of the green light is only around 0.29% and 0.41% and the decay rate of the red light is even only around 18.82% and 18.77%. Accordingly, the infrared filter of the present disclosure is favorable for effectively improving the color shift in the peripheral region of the image.

The foregoing description, for purpose of explanation, has been described with reference to specific embodiments. It is to be noted that TABLES 1-6 show different data of the different embodiments; however, the data of the different embodiments are obtained from experiments; The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An infrared filter comprising:
a transparent substrate; and
an infrared-filtering multilayer film, wherein the infrared-filtering multilayer film is coated on the transparent substrate, and the infrared-filtering multilayer film comprises:
a plurality of the first kind of film layers;
a plurality of the second kind of film layers;
a plurality of the third kind of film layers; and
a plurality of the fourth kind of film layers;
wherein the infrared-filtering multilayer film is wave-like arranged with the four kinds of film layers in order of gradient refractive indexes, a thickness of any of the first kind of film layers is greater than a thickness of any of the second kind of film layers and a thickness of any of the third kind of film layers, a thickness of any of the fourth kind of film layers is greater than the thickness of any of the second kind of film layers and the thickness of any of the third kind of film layers, at least two kinds of film layers are made of composite materials, which are made of $Nb_2O_5$ and $SiO_2$, a refractive index of the first kind of film layers is NA, a refractive index of the second kind of film layers is NB, a refractive index of the third kind of film layers is NC, a refractive index of the fourth kind of film layers is ND, a total number of the film layers of the infrared-filtering multilayer film is TL, a decay rate of transmittance responsivity value through the infrared filter between 554 nm and 700 nm is D, and the following conditions are satisfied:

$2.2 \leq NA < 2.4$;

$1.9 \leq NB < 2.2$;

$1.6 \leq NC < 1.9$;

$1.4 \leq ND < 1.6$;

$80 \leq TL$; and $1\% \leq D \leq 30\%$.

2. The infrared filter of claim 1, wherein the refractive index of the first kind of film layers is NA, the refractive index of the second kind of film layers is NB, the refractive index of the third kind of film layers is NC, the refractive index of the fourth kind of film layers is ND, and the following conditions are satisfied:

$NA-NB \geq 0.1$;

$NB-NC \geq 0.1$; and $NC-ND \geq 0.1$.

3. The infrared filter of claim 2, wherein the refractive index of the first kind of film layers is NA, the efractive index of the second kind of film layers NB, the refractive index of the third kind of film layers is NC, the refractive index of the fourth kind of film layers ND, and the following conditions are satisfied:

$NA-NB \geq 0.15$;

$NB-NC \geq 0.15$; and $NC-ND \geq 0.15$.

4. The infrared filter of claim 1, wherein the decay rate of the transmittance responsivity value through the infrared filter between 554 nm and 700 nn is D, and the following condition is satisfied:

$1\% \leq D \leq 20\%$.

* * * * *